US012780415B2

(12) United States Patent
Moore et al.

(10) Patent No.: US 12,780,415 B2
(45) Date of Patent: Nov. 3, 2026

(54) UNMANNED AERIAL PAYLOAD DELIVERY SYSTEM

(71) Applicant: Southwest Research Institute, San Antonio, TX (US)

(72) Inventors: Andrew Moore, San Antonio, TX (US); Jennifer May-Pyatte, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 127 days.

(21) Appl. No.: 18/367,225

(22) Filed: Sep. 12, 2023

(65) Prior Publication Data

US 2025/0083817 A1 Mar. 13, 2025

(51) Int. Cl.

*B64D 1/22* (2006.01)
*B64U 10/14* (2023.01)
*B64U 101/66* (2023.01)

(52) U.S. Cl.

CPC ................ *B64D 1/22* (2013.01); *B64U 10/14* (2023.01); *B64U 2101/66* (2023.01)

(58) Field of Classification Search

CPC ....... B64D 1/22; B64U 10/14; B64U 2101/66
See application file for complete search history.

(56) References Cited

U.S. PATENT DOCUMENTS 916,331 A * 3/1909 Lance ..................... B65F 1/122 404/109
2018/0072421 A1* 3/2018 Prager .................. G05D 1/0016
2018/0281954 A1* 10/2018 Atchley ................... B64D 1/22
2022/0320669 A1* 10/2022 Gil .......................... F15B 15/20

FOREIGN PATENT DOCUMENTS

WO WO-2023285849 A1 * 1/2023 ............ G01V 1/003

* cited by examiner

*Primary Examiner* — Kimberly S Berona
*Assistant Examiner* — Steven J Shur
(74) *Attorney, Agent, or Firm* — Husch Blackwell LLP

(57) ABSTRACT

A drone with capability to passively deliver a payload to a delivery site. The drone is an unmanned aerial system that includes a container suspended below a main body of the system by way of at least one line. The container may interface a surface at the delivery site to passively deliver the payload. This may be achieved through a passive delivery mechanism that includes one of an actuator to trigger the passive delivery or a container guide for tipping the container upon the interfacing with the surface of the site.

11 Claims, 6 Drawing Sheets

UNMANNED AERIAL PAYLOAD DELIVERY SYSTEM

BACKGROUND

In recent years, unmanned aerial systems or vehicles have become increasingly utilized for a variety of applications. These systems, often referred to as "drones", may be used for passive applications such as the collection of weather data, obtaining video or monitoring a host of environmental conditions. Further, more active applications such as directing an intervention or delivering a payload may be achieved through the use of unmanned aerial systems.

In the case of the more active systems, particular attention may be drawn to the size and weight of the system. For example, FAA regulations are fairly relaxed for aerial systems that weigh less than 250 grams, with licensing and other hurdles taking effect at higher weights. Similarly, once the weight of the system exceeds 55 pounds additional restrictions take effect. Of course, where an active system is involved that includes a payload, the weight of the payload to be delivered counts as part of the weight of the overall system. For more passive systems, weight is often less of a concern due to the availability of small-scale sensors, monitors, video equipment and transceivers. Nevertheless, the same restrictions apply as a matter of public safety given the fact that the lighter the system, the less risk posed to people and the environment in the event of system failure during flight.

Setting aside licensing, regulation and safety issues, the weight of the system is also of concern for other practical considerations. For example, certain powering, maneuverability and other system capabilities may be maximized where weight is kept to within certain predetermined limits.

In the case of an unmanned aerial system that is configured to deliver a payload, multiple weight considerations may be of concern. For example, as with any drone, the weight of the system body must be factored in. However, where a payload is to be delivered, the unavoidable weight of the payload itself must be counted. Furthermore, the added weight of the equipment utilized to trigger or actuate delivery is also of legitimate concern. That is, where a payload is to be delivered in a manner that allows the drone to perform delivery and leave a delivery site without manual intervention, some form of delivery triggering mechanism is also required which must be accounted for in terms of weight.

Conventional delivery triggering mechanisms often include dedicated power, deployment and control mechanisms. Separate communications equipment supporting a receiver, radio and dedicated control channel may also be included. As a result, the opportunity to minimize weight of the overall system, once also accounting for the weight of the payload and the body of the craft may be extremely limited. Thus, as a practical matter, many lightweight payloads that would seem ideal for unmanned aerial delivery are often not deliverable by way of drone without incurring undue regulations and safety concerns.

SUMMARY

An unmanned aerial payload delivery system such as a drone is described. The system includes a platform or body with at least one line for suspending a container there below. The container is configured for housing a payload and is coupled to a passive mechanism for payload delivery. More specifically, upon interfacing with a delivery site, the mechanism triggers passive delivery of the payload from the container to the site.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain unmanned aerial payload delivery systems or drones. For example, a passively actuated payload delivery from such a system is illustrated herein. This may include actuation by way of a passive actuator or foot that is coupled to a payload housing. Alternatively, a passive delivery guide may be utilized to achieve payload delivery wherein the guide is of a shape tailored to facilitate the delivery. Regardless, so long as the system includes a passive mechanism to facilitate delivery from a payload container of the system, appreciable benefit may be realized.

Figure 1:
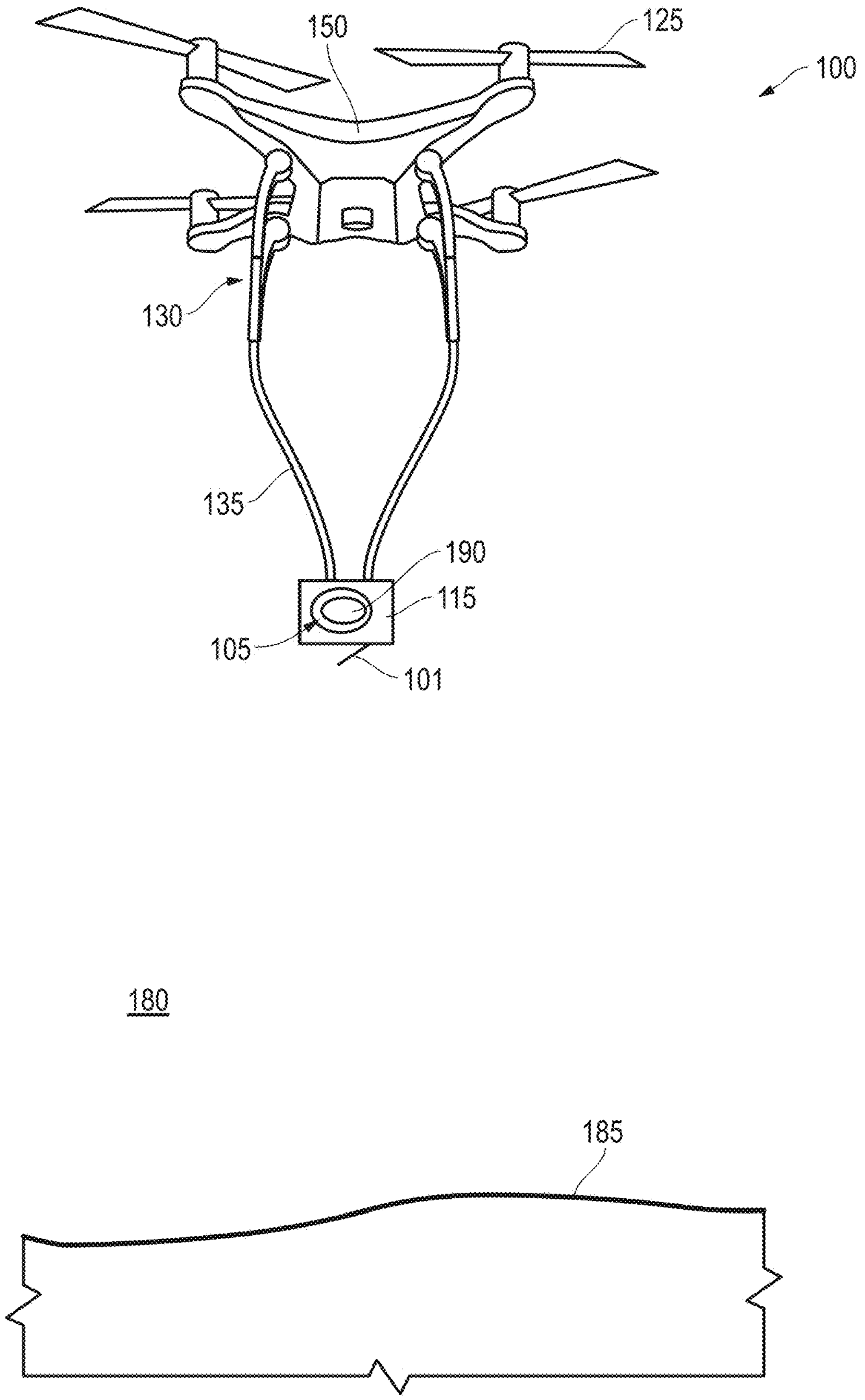
FIG. 1 is an overview depiction of an unmanned aerial payload delivery system during flight.

Referring now to FIG. 1, an overview depiction of an unmanned aerial payload delivery system 100 is shown during flight over a delivery site 185. The delivery site 185 depicted is a ground surface which may a roof, a porch a field or any other practical location where a payload 190 is to be delivered. In the embodiment shown, the payload 190 is located within a container 115 that is suspended from a body 150 of the system 100. The body 150 is shown with a cavity 105 for housing the payload 190.

In the depicted embodiment of FIG. 1, a door at the side of the container is intentionally not shown so as to render the payload 190 visible. However, where the system 100 is in transport and flying above the delivery site 185 as illustrated, the door would normally be present and closed to allow for retaining of the payload 190 within the container 115. Of course, a variety of alternative architectures may be employed such as one or more doors with the capacity to open at the bottom of the container 115 or the top or even an opening without a door at the top of the container 115. In one embodiment, one or multiple doors at a side of the container 115 may even open for payload delivery.

Continuing with reference to FIG. 1, the unmanned aerial payload delivery system 100 may be a conventional lightweight drone with propellers 125 to transport the system 100 through the air 180 as illustrated. Of course, propulsion may be provided by fans, wheels or a variety of other modes. Regardless, along with the body 150 and internal communications and powering equipment, the propulsion system will contribute to the weight of the delivery system 100. Similarly, a suspension mechanism 130 with lines 135 securing the container 115 also contributes to the overall weight of the delivery system 100.

Figure 2:
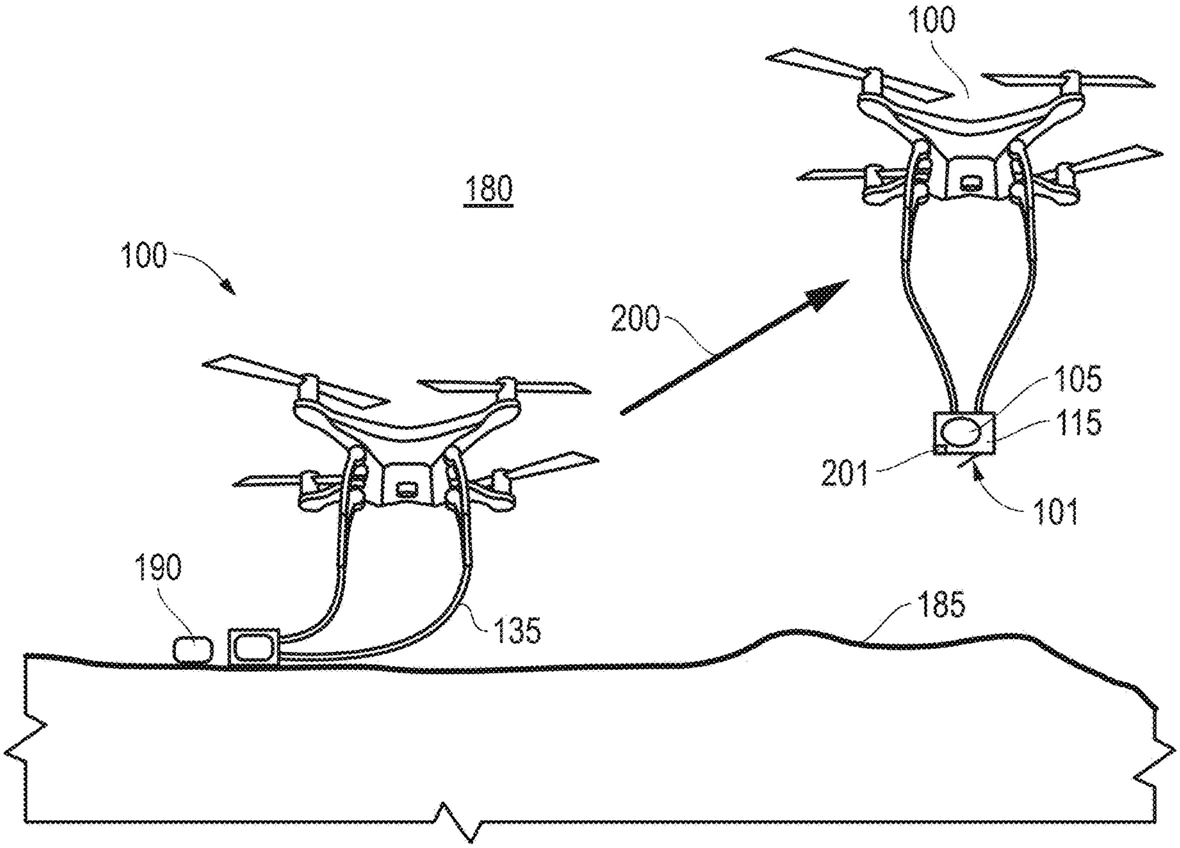
FIG. 2 is an overview depiction of the system of FIG. 1 during delivery of a payload to a ground surface and subsequent flight.

Alternative embodiments may be employed that utilize different forms of suspension or none at all. However, discretely suspending the container 115 from below the body 150 of the system 100 may be uniquely advantageous for embodiments detailed herein. For example, in the illustrated embodiment, isolating the container 115 to a unique location below the body 150 may help facilitate interfacing of an actuator 101 with the surface of the delivery site 185 as guided by system maneuvering. A degree of slack may even be introduced to the lines 135 to allow the weight of the container 115 to help in the force of the interfacing of the actuator 101 with the ground site 185. Thus, as illustrated in FIG. 2, the interfacing may lead to a triggering open of the above referenced door for releasing of the payload 190 from the container 115 as described further below. As a result, the payload 190 may be automatically and passively delivered at the site 185.

Continuing with reference to FIG. 1, The actuator 101 is a mechanical foot that may trigger door opening and payload delivery in a passive manner without the need for a dedicated power source and the associated weight of such a source. Alternatively, a sensor 201 or sufficiently lightweight actuator type may be utilized (see FIG. 2). In the case of a sensor embodiment, microelectronic powering and actuation may be provided with a sensor package incorporated into the container 115. Where applicable, this may constitute dedicated power, yet nevertheless be available at weights that are even less than a purely mechanical foot version of the actuator 101 as illustrated. For such an embodiment, the microelectronics of the sensor package may be pre-programmed to only allow for actuation to be triggered after a predetermined period following initial takeoff of the system 100. In this way early ground detections during takeoff will not accidentally result in prematurely triggering a delivery sequence for the payload 190.

Regardless, a conventional spring-based release or other passive mechanism may be triggered by the actuator 101 for automatic passive release of the payload 190. It is of note that the actuator 101 and passive mechanism also do not require dedicated communications equipment and the associated weight to effect the payload delivery. Rather, the interfacing of the actuator with the delivery site 185, whether through direct contact with a mechanical foot 101, or with a possible degree of separation in the case of a sensor 201, is alone sufficient to trigger the delivery. As a result, weight savings may be achieved that may extend flight time, transport distance, weight of the payload 190 and even help to avoid a degree of flight regulation requirements.

Referring now to FIG. 2, an overview depiction of the system 100 of FIG. 1 during delivery of a payload 190 to a ground surface site 185 is illustrated (at left) along with subsequent flight (at right). A side opening to the container 115 has allowed the payload 190 to be delivered to the site 185 from the cavity 105. More specifically, as the actuator 101 interfaces with the ground surface, an internal triggering mechanism such as a spring, may release to actuate the opening of a door to the cavity 105 and payload release. Utilization of a spring, or similar conventionally passive device, to power the actuation, means that no more than the interfacing of the actuator 101 with the ground surface of the site 185 is required to achieve the depicted delivery.

Continuing with reference to FIG. 2, the actuator 101 interfacing with the site 185 sufficiently to achieve delivery may require an amount of predetermined force. That is, prior to the interfacing, with the system 100 still in the air 180, the actuator 101 may be constructed or set to avoid premature delivery such as might occur from a wind gust, quick descent or other factor. So, for example, where the actuator 101 is of the illustrated foot configuration, a predetermined level of force such as between about 25 g and about 35 g may be required during the interfacing in order for the foot to trigger the actuation and delivery. The predetermined force of interfacing sufficient to trigger delivery may also be set at a threshold that is somewhere below the weight of the payload 190. For example, this may be beneficial for embodiments where the actuator is incorporated into a door at the bottom of the container 115. Thus, operators may be assured that the triggering threshold is not set so high that the weight of the payload 190 is not enough to achieve door opening. As a result, the passiveness of the delivery also remains assured.

The delivery illustrated at the left of FIG. 2 is achieved without the need for the system 100 to fully land. As a result, additional power that might otherwise be required for a separate take-off as shown at the right of FIG. 2 may not be required. This means that in addition to avoiding the added weight and complexity of dedicated powering, controls and other active delivery features, the weight of the power source(s) for the entire system 100 may be kept to a minimum and/or capable of supporting longer flight times and distances.

Continuing with reference to FIG. 2, the drone system 100 is shown moving from the delivery site 185 back into flight for return (see arrow 200). The foot actuator 101 has returned to a natural hanging orientation from the bottom of the container 115. Of course, depending on the configuration, the foot may remain retracted, hang loosely or even be left behind. Regardless, the interfacing and delivery maneuvers have been passive throughout the process. In one embodiment, this occurs by way of the interfacing forcing a movement of the foot actuator 101 sufficient to trigger the release of a pin, which in turn releases a compressed spring for the powering open of a door and delivery of the payload 190 through conventional mechanical means.

It is of note that while the illustrated embodiment shows the foot actuator 101 exclusively below the capsule container 115, other architectures may be utilized. For example, a laterally articulated lever or a lever arm actuator 101 may be employed to allow for delivery upon contact with a side surface at the site 185. Thus, for circumstances where delivery is sought in a manner other than by way of a purely downward motion of the system 100, it may be achieved in another fashion and, if desired, without the container 115 making landed contact with the ground surface at the site 185. Of course, where the actuator 101 is a conventional sensor or of another configuration, alternate modes that are not limited to purely downward motion or ground contact may also be available.

Various capsule or container 115 embodiments may be employed beyond that illustrated in FIGS. 1 and 2. For example, as opposed to a side door opening, the container 115 may be opened from below or from the top. In certain embodiments, an open top container 115 with no door to the cavity 105 at all may be employed. These embodiments may have the added advantage of allowing the spring or other passive powering mechanism to facilitate no more than the forced release of the payload 190 without any added requirement of door opening. In fact, for certain open-top container 115 embodiments, the release of the payload 190 may not only avoid the requirement of forced door opening but even forced delivery of the payload 190 itself may be avoided. Thus, the use of a spring and related moving part mechanical features may be avoided altogether. Instead, maneuvering of the system 100 upon ground contact may be sufficient for tipping the container 115 in a fashion that allows payload delivery as detailed for embodiments as described below.

Figure 3A:
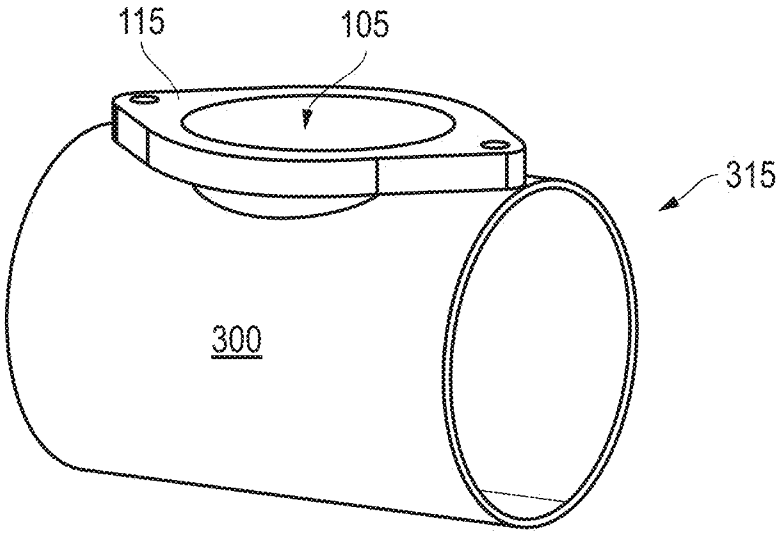
FIG. 3A is a perspective view of an embodiment of a payload delivery guide for an unmanned aerial payload delivery system.

Referring now to FIG. 3A, a perspective view of an embodiment of a payload delivery guide 300 is shown for an unmanned aerial payload delivery system 100 such as that of FIGS. 1 and 2. In this embodiment, rather than utilizing a discrete actuator 101, a guide 300 is provided as a landing surface in conjunction with the container 115. The container 115 is configured for housing the payload 190 as with other embodiments described above. However, rather than reliance on an actuator 101, a tubular guide 300 is provided for the interfacing with the ground surface site 185. The tubular guide 300 is of a curved shape for interfacing with the ground surface site 185. Thus, once slack is introduced to the lines 135 by way of the lowering system 100, the container 115 may be allowed to naturally tip over to one side or the other to release the payload 190 from the cavity 105. Indeed, the system 100 may even be utilized to pull one of the lines 135 and induce a roll on the guide 300 to ensure a sufficient tip the container 115 for releasing of the payload 190.

Figure 3B:
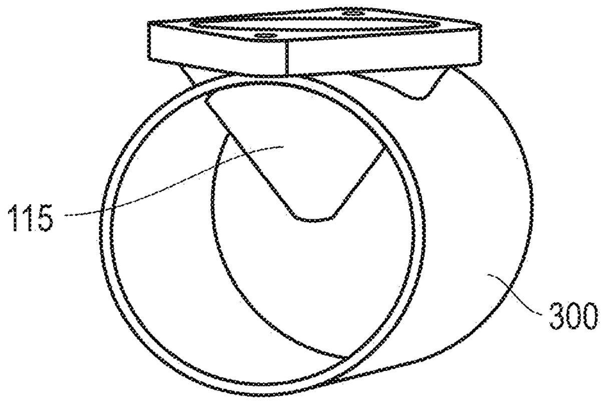
FIG. 3B is a side view of the payload delivery guide of FIG. 3A illustrating a payload container coupled thereto.

Referring now to FIG. 3B, a side view of the payload delivery guide 300 of FIG. 3A is shown. In this view, the container 115 is visible with a conical shape. Utilizing a shape of this type ensures that the payload 190 is presented with a decline or ramp to help facilitate emptying of the payload 190 from the container 115 once the guide 300 has rolled sufficiently to tip the top of the container 115 from an upright position as shown to one that is more lateral or even further toward the ground surface delivery site 185. In the embodiment shown, the container 115 includes an open top. However, in another embodiment, the top may include a door to automatically open as the container 115 is rolled to one side or the other. Thus, an added precaution may be provided to help avoid premature accidental delivery of the payload 190 in advance of reaching the intended site 185.

Figure 4A:
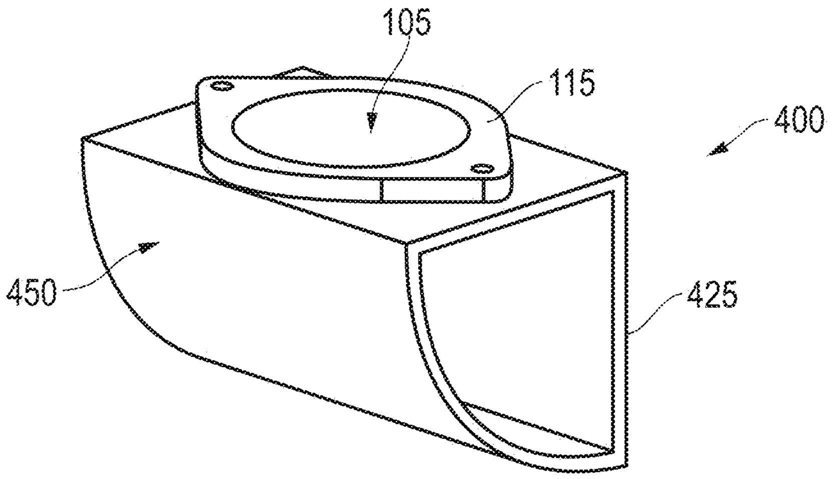
FIG. 4A is a perspective view of another embodiment of a payload delivery guide for an unmanned aerial payload delivery system.

Referring now to FIG. 4A, a perspective view of another embodiment of a payload delivery guide 400 is illustrated for an unmanned aerial payload delivery system 100 such as that of FIGS. 1 and 2. In this embodiment, the guide 400 again includes a curved surface 450. However, this embodiment also includes a flat side surface 425. Thus, upon physical interfacing with a ground surface at the site 185, a natural lean toward the curved surface may be naturally facilitated. In this way, where the delivery site 185 presents concerns over natural tipping of the container 115, for example, due to tall grass or other factors, the guide shape is more likely to ensure tipping in the direction of the curved surface 450.

Figure 4B:
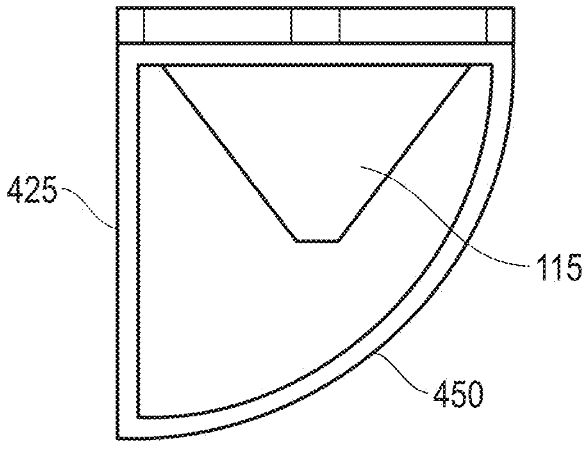
FIG. 4B is a side view of the payload delivery guide of FIG. 4A illustrating a payload container coupled thereto.

Referring now to FIG. 4B, a side view of the payload delivery guide 400 of FIG. 4A is shown illustrating the payload container 115 incorporated therein. In this view, the conical shape of the container 115 is apparent. Further, with the guide 400 tilted toward the curved surface 450, following landing at the site 185, the decline presented to a payload 190 by the inner surface of the container 115 is apparent. Thus, the same shape of the cavity 105 that promotes payload security during transport may also facilitate delivery once reaching the site 185. Once more, in one embodiment, the system 100 may be maneuvered to overcome the natural tilt toward the curved surface 450, so as to forcibly direct the flat side surface 425 into interface with the ground site 185 during delivery of the payload 190. In this way, a more stable and stationary manner of delivery may be provided.

Figure 5:
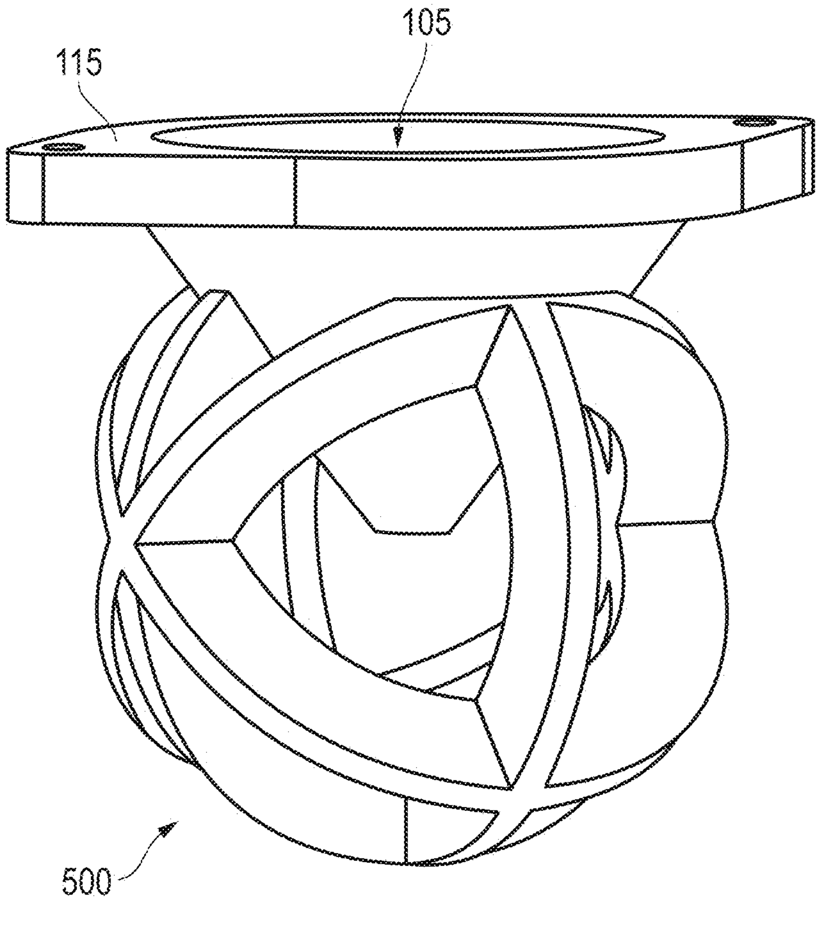
FIG. 5 is a perspective view of another embodiment of a payload delivery guide for an unmanned aerial payload delivery system.

Referring now to FIG. 5, a perspective view of another embodiment of a payload delivery guide 500 is shown for an unmanned aerial payload delivery system 100 such as that of FIGS. 1 and 2. For this embodiment, the guide 500 is of a body that is spherical in nature and in skeleton form. The spherical nature of the guide 500 means that passive delivery of a payload 190 may be achieved with the container 115 tipping in any direction due to its weight over the guide 500 once sufficient slack is introduced to the lines 135 during interfacing with a ground site 185. Of course, the skeleton form of the guide 500 may be utilized so as to reduce weight in a manner that avoids compromise to the durability of the structure in terms of achieving transport and payload delivery from the cavity 105.

An embodiment such as that of FIG. 5 may alternatively be partially spherical with a flat side surface similar to the guide 400 embodiment illustrated in FIGS. 4A and 4B. Indeed, any number of naturally tipping guide embodiment morphologies may be utilized. So long as the weight of the container 115 presents a top-heavy condition and the shape of the guide 500 presents a degree of instability to remaining in a vertical position as shown once the container 115 reaches interfacing with the ground site 185 with the lines 135 slacking, a passive delivery of a payload 190 may be facilitated.

Figure 6:
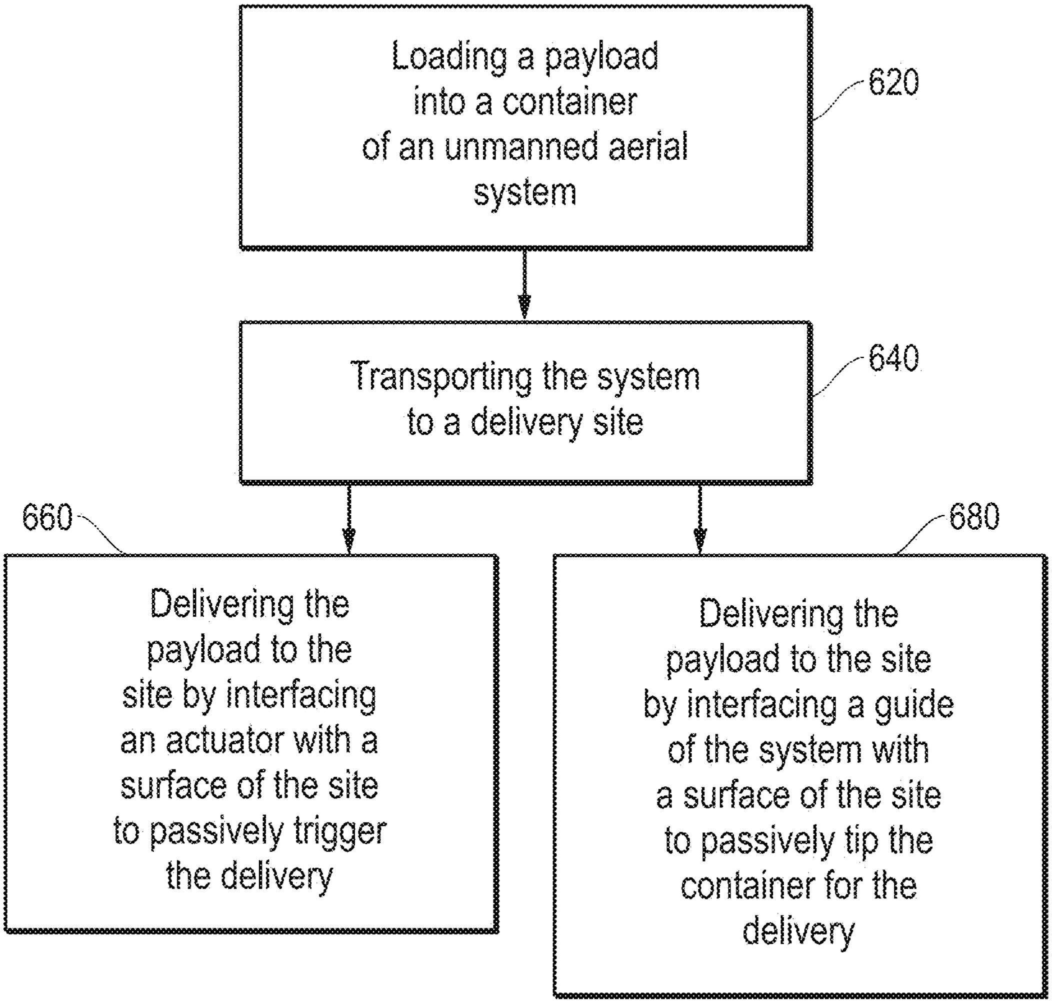
FIG. 6 is a flow-chart summarizing a method of employing an unmanned aerial payload delivery system in a passive manner.

Referring now to FIG. 6, a flow-chart summarizing a method of employing an unmanned aerial payload delivery system in a passive manner is shown. Namely, once the payload is loaded onto a container of the system as noted at 620, it is transported to a delivery site (see 640). At this point passive delivery of the payload from the system to the site takes place. For example, an actuator of the system may interface with a surface of the ground site to automatically trigger passive delivery of the payload (see 660). Other passive delivery techniques may include the incorporation of a delivery guide morphology to the container of the system housing the payload. Thus, as indicated at 680, the natural tipping of the container upon guide interface with the ground surface is sufficient for passively effectuating delivery of the payload to the site.

Embodiments described above provide for drone payload delivery in a manner that does not require separate dedicated power, deployment and control mechanisms. The embodiments detailed are such that conventional drones may be retrofitted with such features. In either case, power and weight savings may be significant which can support longer flight times over greater distances without compromising other specification requirements.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An unmanned aerial payload delivery system comprising:

a body of the system;

at least one line for suspending a container below the body; and a landing surface of the container to present a curved morphological shape configured to achieve a rolling delivery of a payload from the container to a delivery site surface upon the landing surface interfacing therewith.

2. The system of claim 1 wherein the container is of a top opening configuration.

3. The system of claim 2 wherein a cavity defining the container interior presents a decline surface to the payload during the delivery.

4. A delivery guide for a payload container of an unmanned aerial delivery system, the delivery guide comprising a landing surface of a curved morphological shape secured below an opening to the container at a top thereof that is configured to achieve a rolling delivery of a payload from the container upon interfacing between the landing surface and a delivery site surface.

5. The delivery guide of claim 4 wherein the morphological shape is at least partially one of tubular, spherical and skeletal.

6. The delivery guide of claim 4 further comprising a flat side surface.

7. The delivery guide of claim 4 wherein the container comprises a cavity leading to the opening for the passive delivery of the payload.

8. The delivery guide of claim 7 wherein the cavity is of a conical shape to facilitate the delivery.

9. A method of delivering a payload to a delivery site, the method comprising:

loading a payload into a container of an unmanned aerial delivery system;

suspending the container with a landing surface of a curved morphological shape from a body of the system;

transporting the system to the delivery site;

interfacing the curved morphological shape of the landing surface with a the delivery site surface; and delivering the payload to the site by way of the interfacing to attain a rolling delivery of the payload from the container.

10. The method of claim 9 wherein the interfacing comprises introducing slack in at least one line supporting the suspending of the container from the body.

11. The method of claim 9 further comprising moving on from the delivery site after the delivery in absence of landing of the system.

* * * * *